US 12,162,365 B2
(12) United States Patent
Endler et al.

(10) Patent No.: US 12,162,365 B2
(45) Date of Patent: Dec. 10, 2024

(54) CURRENT COLLECTOR, CONDUCTOR LINE AND CONDUCTOR LINE SYSTEM

(71) Applicant: Conductix-Wampfler GmbH, Weil am Rhein (DE)

(72) Inventors: Niklas Endler, Schwörstadt (DE); Bernd Maier, Schliengen (DE); Nicholas Winter, Lörrach (DE)

(73) Assignee: Conductix-Wampfler GmbH, Weil am Rhein (DE)

( * ) Notice: Subject to any disclaimer, the term of this patent is extended or adjusted under 35 U.S.C. 154(b) by 886 days.

(21) Appl. No.: 17/289,777

(22) PCT Filed: Jul. 25, 2019

(86) PCT No.: PCT/EP2019/070006
§ 371 (c)(1),
(2) Date: Apr. 29, 2021

(87) PCT Pub. No.: WO2020/088806
PCT Pub. Date: May 7, 2020

(65) Prior Publication Data
US 2021/0394619 A1  Dec. 23, 2021

(30) Foreign Application Priority Data

Oct. 31, 2018  (DE) .................... 10 2018 127 304.5

(51) Int. Cl.
*B60L 5/08*  (2006.01)
*B60L 5/06*  (2006.01)
(Continued)

(52) U.S. Cl.
CPC  *B60L 5/08* (2013.01); *B60L 5/06* (2013.01); *B60M 1/30* (2013.01); *H01Q 1/3225* (2013.01);
(Continued)

(58) Field of Classification Search
CPC ...... B60L 5/08; B60L 5/06; B60L 5/12; B60L 5/04; B60L 5/40; B60M 1/18; B60M 1/30;
(Continued)

(56) References Cited

U.S. PATENT DOCUMENTS 4,464,546 A * 8/1984 Culver ..................... B60L 5/08
191/49
5,676,224 A * 10/1997 Clarke ..................... B60L 5/08
191/49
(Continued)

FOREIGN PATENT DOCUMENTS

CN  101378931 B  3/2009
CN  105359353 A  2/2016
(Continued)

OTHER PUBLICATIONS

International Preliminary Report on Patentability dated Apr. 27, 2021 with Written Opinion for PCT/EP2019/070006, filed Jul. 25, 2019 (English translation).
(Continued)

*Primary Examiner* — Zachary L Kuhfuss
*Assistant Examiner* — Heaven R Buffington
(74) *Attorney, Agent, or Firm* — Paul D. Bianco; Stephen Bongini; Fleit Intellectual Property Law

(57) ABSTRACT

A current collector has a sliding contact for making electrical contact with a conductor profile of a conductor line, and an antenna for insertion into a longitudinal slot, which runs in a longitudinal direction of the conductor line. The sliding contact and the antenna can be moved jointly towards the conductor profile in a feed direction by a feed device of the current collector. The antenna is movably mounted on the current collector. Also provided are a conductor line and a conductor line system.

18 Claims, 2 Drawing Sheets

(51) Int. Cl.
    *B60M 1/30*     (2006.01)
    *H01Q 1/32*     (2006.01)
    *H01Q 13/22*     (2006.01)
    *H01R 41/00*     (2006.01)
    *B60M 1/06*     (2006.01)
    *B60M 1/18*     (2006.01)

(52) U.S. Cl.
    CPC ............. *H01Q 13/22* (2013.01); *H01R 41/00* (2013.01); *B60M 1/06* (2013.01); *B60M 1/18* (2013.01)

(58) Field of Classification Search
    CPC ....... B60M 1/06; H01Q 1/3225; H01Q 13/22; H01Q 13/20; H01R 41/00
    See application file for complete search history.

(56) References Cited

U.S. PATENT DOCUMENTS

| | | | |
|---|---|---|---|
| 10,137,801 B2 | 11/2018 | Eckle | |
| 2013/0213754 A1* | 8/2013 | Hiebenthal | ............... B60L 5/39 |
| | | | 191/49 |
| 2016/0137101 A1 | 5/2016 | Eckle | |

FOREIGN PATENT DOCUMENTS

| | | | | |
|---|---|---|---|---|
| CN | 107406008 A | 11/2017 | | |
| DE | 10 2014 107 466 A1 | 12/2015 | | |
| DE | 10 2015 120 345 A1 | 5/2017 | | |
| DE | 10 2016 102 912 A | 8/2017 | | |
| DE | 10 2016 103 919 A1 | 9/2017 | | |
| FR | 2 952 237 A1 | 5/2011 | | |
| WO | WO-2017148999 A1 * | 9/2017 | ............. B60L 53/16 |

OTHER PUBLICATIONS

Chinese Examiner's Report dated Sep. 13, 2023 for Chinese Application No. 201980065002.
Notification of Reasons for Refusal dated Mar. 15, 2022, for Japanese Patent Application No. 2021-519123 (with translation) (7 pages).
International Search Report for PCT/EP2019/070006, filed Jul. 25, 2019 and Written Opinion.
Result of Examination Report for German Patent Application No. 10 2018 127 304.5 dated Oct. 31, 2018.
Harald Dalichau. "Ubergange und Fahrzeugkoppler fur Schlitzhohlleiterstrecken Adapters and Vehicle-Couplers for Slotted Waveguide Systems" Frequenz, vol. 36. No. 6. Jan. 1, 1982 (Jan. 1, 1982). pp. 169-175 XP055629248 (English Abstract).

* cited by examiner

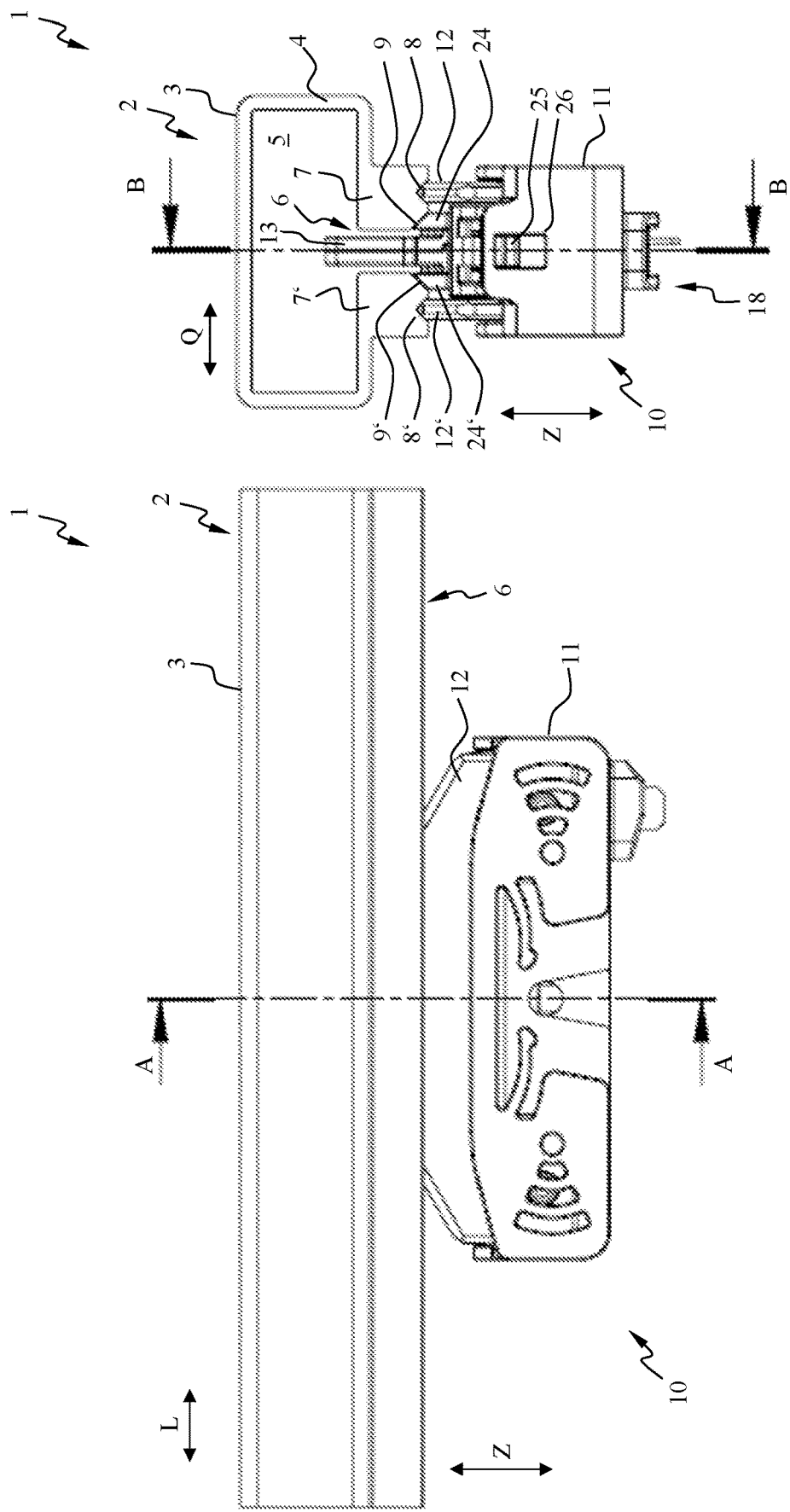

CURRENT COLLECTOR, CONDUCTOR LINE AND CONDUCTOR LINE SYSTEM

FIELD OF THE INVENTION

The present invention relates to a current collector a conductor line and a conductor line system.

BACKGROUND

The generic DE 10 2014 107 466 A1 discloses a conductor line system with a conductor line which supplies electrical loads moving along the conductor line with electrical energy through sliding contacts of a current collector. One conductor profile of the conductor line is configured as an assembly comprising the grounding conductor profile and the slotted waveguide for data transmission from and to the electrical load. To this end, an associated current collector comprises a sliding contact for making contact with the grounding conductor profile, on the one hand, and an antenna for insertion into the slotted waveguide, on the other hand, which are configured to form an assembly. The sliding contact is continuously pressed by spring force in the direction of the grounding conductor profile in order to ensure uninterrupted contact with the conductor profile. Since the sliding contact is subject to wear with time, the antenna is increasingly pushed deeper and deeper into the slotted waveguide, which has the effect that the transmission characteristics of the slotted waveguide successively change so that the transmission of data can be impaired. Furthermore, a conductor line frequently supplies electrical power to a plurality of electrical loads, for example, in electrified monorail systems, which causes the attenuation properties to change because of the continuously changing depths of penetration of the antennae of the electrical loads into the slotted waveguide, so that the transmission of data is adversely affected, for example, at times overloaded, at times underloaded.

FR 2 952 237 A1, which relates to the field of accessories for flexible radio antenna, discloses a device comprising a stop unit in the vicinity of a flexible mounting unit, which stop unit limits the movement of a flexible radio antenna relative to a carrier which is integrated into a structure, e.g., a vehicle. The stop unit has a metal cylinder which surrounds the antenna at the level of the mounting unit. The cylinder has a bottom part in which an axial bore is formed, which makes it possible to center and mount the antenna on the carrier. The mounting unit comprises a spring which is connected to a base which is attached to the carrier by means of a nut.

DE 10 2016 102 912 A discloses a conductor line having a conductor rail which is formed by an extruded slotted hollow profile, with side walls delimiting the slotted cavity and the conductor rail forming at least one running and/or guide surface for a current collector carriage that can be moved along a conductor line, wherein at least one electrical busbar for the transmission of energy and/or data is arranged on the inside surface of at least one side wall of the hollow profile that bounds the cavity, and wherein at least one electrical slotted waveguide is arranged or integrated in the cavity or in at least one side wall.

SUMMARY OF THE INVENTION

Thus, one aspect of the invention relates to a current collector, a conductor line and a conductor line system, which overcome the above-mentioned disadvantages and allow the most uniform, undisrupted data transmission possible.

Accordingly, disclosed herein are a current collector, a conductor line, and a conductor line system. Advantageous refinements and embodiments invention are also disclosed.

According to the invention, the current collector mentioned above is characterized in that the antenna is mounted on the current collector so as to be able to move in the feed direction relative to the sliding contact. When the sliding contact moves in the feed direction towards the conductor line, the antenna can preferably be mounted so as to be able to move into the opposite direction, i.e., in the feed direction away from the conductor line. This makes it possible, on the one hand, for the sliding contact to be pressed against the conductor profile, thereby ensuring a reliable electrical contact, and for the antenna to avoid the movement of the sliding contact in the feed direction towards the conductor line when the height of the sliding contact decreases due to wear and the sliding contact as a result thereof continues to move increasingly closer to the conductor line, on the other hand.

The antenna can preferably be disposed in an antenna holder which can move in the feed direction relative to the sliding contact. To ensure that the depth of penetration of the antenna into the longitudinal slot and/or the cavity of the conductor profile remains as defined and consistent as possible, at least one a spacer element, in particular a spacer slide or a spacer roller for sliding or rolling on the conductor profile, can be disposed on the antenna holder. By pressing the sliding contact and the spacer slide against the conductor profile because of the possible evasive movement of the antenna holder relative to the sliding contact as well as to the antenna, which movement is directed in the feed direction against the sliding contact to keep it from moving closer to the conductor profile, it is possible to advantageously maintain the antenna at the consistent depth of penetration desired.

Preferably two spacer slides disposed on the side of the antenna can be arranged on opposite sides of the antenna holder, the spacer slides being preferably oriented in the longitudinal direction. The spacer slides can preferably have slanted front faces which slide on complementary slanted spacer slide surfaces at the outside end of the longitudinal slot.

Preferably disposed between the sliding contact and the antenna is at least one compensating element which presses the antenna in the feed direction towards the conductor line but at the same time allows the evasive movement of the antenna and, where appropriate, of the spacer slides relative to the sliding contact against the feed direction towards the conductor line. Even if the sliding contact closes in on the conductor profile, the antenna remains at the same depth of penetration in the longitudinal slot and/or cavity of the conductor profile since only the sliding contact moves in the feed direction towards the conductor line while the antenna and, where appropriate, the antenna holder in the feed direction remain in the same position relative to the conductor line. The sliding contact can preferably be disposed in a sliding contact carrier, with the compensating element being arranged between the sliding contact carrier and the antenna and/or the antenna holder. The sliding contact carrier, along with the sliding contact, is then pressed in the feed direction against the conductor profile, while the antenna holder and the antenna in the feed direction remain in the same position relative to the conductor profile. Thus, the compensating element allows the spacing between the sliding contact carrier and the antenna or antenna holder to be changed, especially in the feed direction.

The compensating element can preferably comprise at least one elastic element and/or a compensating spring which acts between the sliding contact and sliding contact holder and the antenna and antenna holder, respectively. The elastic element can preferably be made of rubber, particularly soft rubber.

In an advantageous refinement, when the sliding contact is deflected from its contact position on the conductor profile in the feed direction away from the conductor profile, the feed device can exert a restoring force on the sliding contact and the sliding contact carrier in the feed direction towards the conductor profile. The feed device can preferably comprise a spring arm known in the art.

In a favorable refinement, the antenna, or at least the part of the antenna that is inserted into the longitudinal slot, can be surrounded by an electrically insulating protective sleeve so as to avoid electrical contact with the longitudinal slot.

The feed direction can favorably extend at right angles to a traversing plane of the current collector, which traversing plane runs through the longitudinal direction. More specifically, the feed direction can substantially extend in a slot plane formed by the longitudinal slot, especially the height thereof, and the longitudinal direction.

According to the present invention, the above-mentioned conductor line is characterized in that the conductor profile has at least one spacer slide surface, which runs in the longitudinal direction, for at least one spacer slide of the current collector. Two spacer slide surfaces can favorably be disposed on opposite sides along the sides of the longitudinal slot. The spacer slide surfaces can preferably extend outwardly at an oblique angle away from the longitudinal slot so that the outside edges of the longitudinal slot are slanted. The cavity and the longitudinal slot can preferably form a slotted waveguide. In an advantageous advanced modification, the spacer slide surface can also be configured on or by a sliding contact nut of the conductor profile, in which case the spacer slides are arranged in the longitudinal direction upstream and/or downstream of the sliding contacts. The conductor profile can preferably be a grounding conductor profile.

The conductor profile and the slotted waveguide can preferably form an assembly that is integrally made in one piece from the same material. However, the conductor profile and the slotted waveguide can also be separate components and be made of different materials to form separate parts or an assembly. The conductor profile and the slotted waveguide can preferably be made of an electrically conductive material and/or have an electrically conductive coating. In particular, the inside surface of the slotted waveguide can be coated with an electrically conductive coating. The slotted waveguide can also have a different suitable cross section.

According to the present invention, the above-mentioned conductor line system is characterized in that the antenna, in the feed direction relative to the sliding contact, is movably mounted on the current collector. When the sliding contact moves in the feed direction towards the conductor line, the antenna can preferably be movably mounted in the opposite direction, i.e., in the feed direction away from the conductor line. To this end, a current collector and/or conductor line as described above and further described below can preferably be used.

BRIEF DESCRIPTION OF THE DRAWINGS

The invention will be described below based on detailed embodiment examples with reference to the accompanying drawings. The drawing show:

FIG. 1 a front view of a section of a conductor line system according to the present invention;

FIG. 2 a side view of the conductor line system shown in FIG. 1 as seen from the left;

DETAILED DESCRIPTION

Figure 4:
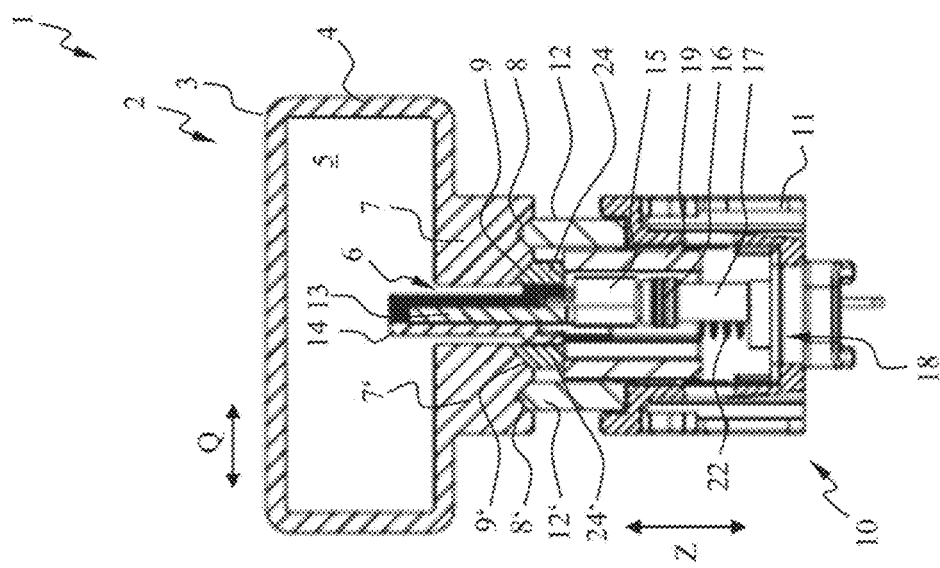
FIG. 4 a cross-sectional view of the conductor line system through line A-A shown in FIG. 1.
Figure 3:
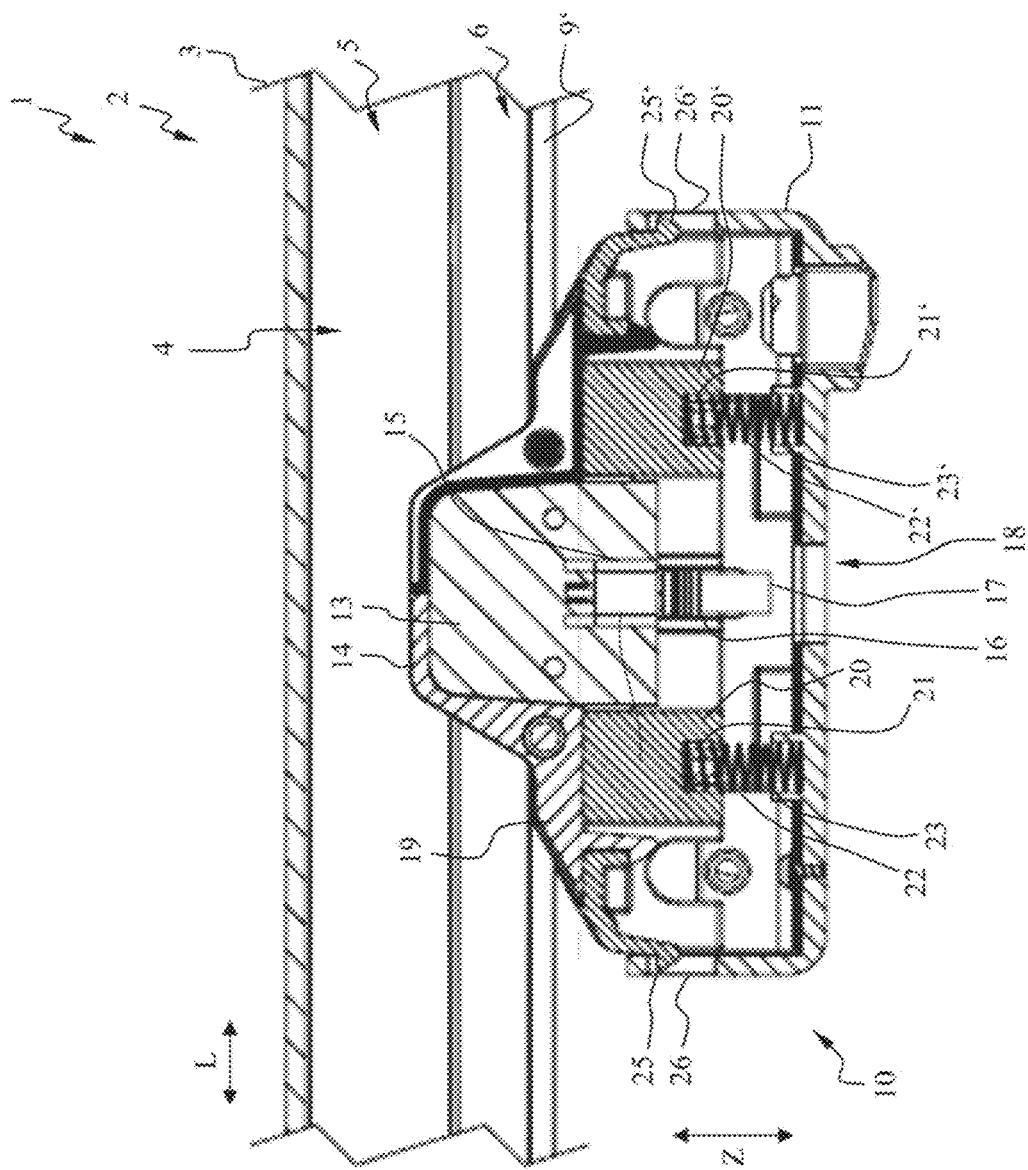
FIG. 3 a cross-sectional view of the conductor line system through line B-B shown in FIG. 2.

FIG. 1 shows a front view of a section of a conductor line system 1 according to the invention with a conductor line 2 extending in a longitudinal direction L, on which conductor line electrical loads, for example, a container crane, can be moved in the longitudinal direction L in a manner known in the art. These electrical loads are supplied with electrical energy via phase conductor profiles not shown in the drawings, with the invention being principally usable with such a phase conductor profile.

An elongated, electrically conductive grounding conductor profile 3 shown in the drawings serves to connect the electrical load of the conductor line system 1. The grounding conductor profile 3 forms an essentially T-shaped slotted waveguide 4 having a cavity 5 intended for data transmission, which cavity, in the drawings, merges into a downwardly open longitudinal slot 6. However, the grounding conductor profile 3 can also be used with a longitudinal slot 6 that opens to the side.

In the drawing, the grounding conductor profile 3 and the slotted waveguide 4 are integrally made in one piece from the same material and thus form an assembly, which thereby simplifies construction and installation. However, the grounding conductor profile 3 and the slotted waveguide 4 can also be separate components and/or be made from different materials to form separate parts or an assembly. The grounding conductor profile 3 and the slotted waveguide 4 are made of an electrically conductive material or are coated with an electrically conductive coating. In particular, the inside surface of the slotted waveguide 4 can be coated with an electrically conductive coating. The slotted waveguide 4 can also have a different suitable cross section.

Disposed on the side adjoining the longitudinal slot 6, the grounding conductor profile 3 further has longitudinal crosspieces 7, 7' on both sides in which sliding contact grooves 8, 8' running in the longitudinal direction L at a distance from the longitudinal slot 6 are disposed. Disposed directly along the outer longitudinal edges of the longitudinal slot 6 are outwardly slanted spacer slide surfaces 9, 9'.

On the electrical load (not shown in the drawings), a current collector 10 is disposed in a manner known in the art, which current collector has two sliding contacts 12, 12' contained in a sliding contact carrier 11. The sliding contacts 12, 12' are disposed parallel to the longitudinal direction L off-center of the sliding contact carrier 11 and their free wedge-shaped ends engage in the sliding contact grooves 8 and 8'. However, instead of the wedge-shaped configuration, different cross sections of sliding contact grooves 8, 8' and sliding contacts 12, 12' can be used.

The current collector 10 is continuously pressed in the direction of the conductor line 2 by a feed device known in the art (not shown in the drawings) so as to ensure reliable contact between the sliding contact grooves 8, 8' and the sliding contacts 12, 12'. Worn sliding contacts 12, 12' can be moved away from the conductor line 2 via the feed device or by other means.

An electrically conductive antenna 13 of the current collector 10 extends through the longitudinal slot 6 into the cavity 5 of the slotted waveguide 4. As is clearly shown in FIG. 4, the antenna 13 is surrounded by an insulating protective sleeve 14 so as to avoid electrical contact between the antenna 13 and the slotted waveguide 4. On the side facing away from the conductor line 2, the antenna 13 further has an antenna socket 15 for plugging in an antenna plug 16 of an antenna line 17. The antenna line 17 extends through a through opening 18 of the current collector 10 to the electrical load and the controller thereof.

To prevent the antenna 13 from being pushed by the current collector 10 deeper and deeper into the cavity 5 of the slotted waveguide 4 with steadily increasing wear of the sliding contacts 12, 12', the antenna 13 is disposed in an antenna holder 19, which is movable relative to the sliding contact carrier 11 in a feed direction Z to the conductor line 2. The antenna holder 19 also comprises the protective sleeve 14.

The antenna holder 19 comprises two spring blocks 20, 20' which are disposed in the longitudinal direction L upstream and downstream of the antenna 13 and which, on the side facing away from the conductor line 2, have each a spring seat 21, 21' in the form of a depression. One end of a compensating spring 22, 22', here configured in the form of a helical spring, is inserted into each of the spring seats 21, 21', while the respective other end of the compensating springs 22, 22' is inserted into each sleeve-shaped spring seat 23, 23' on the sliding contact carrier 11. However, the spring seats 21, 21' and 23, 23' can also be differently configured, for example, in the form of mandrels, onto which the ends of the compensating springs 22, 22' are placed. However, other types of compensating spring 22, 22' can also be used. Where appropriate, only one compensating spring may be provided.

The antenna holder 19 further comprises two spacer elements which are disposed transverse relative to the longitudinal direction L and the feed direction Z, i.e., in the transverse direction Q, and configured in the form of spacer slides 24, 24', and which slide along the spacer slide surfaces 9, 9'. The spacer slides 24, 24' preferably have an as smooth as possible sliding surface abutting the spacer slide surfaces 9, 9' and can, for example, be coated with, or be completely made of, a low-friction material, for example, PTFE, a ceramic material, metal alloys known in the art, etc. The spacer slides 24, 24' can preferably also be made of a wear-resistant material so as to delay any further penetration of the antenna 13 into the cavity 5 due to wear of the spacer slides 24, 24' for as long as possible. Similarly, it is possible for the spacer slide surfaces 9, 9' to be coated with, or to be made of, a smoothly sliding, low-friction and/or wear-resistant material.

The spacer slides 24, 24' are disposed on both sides of, and preferably symmetrically about, a slot plane or antenna plane which extends along the longitudinal direction L and the feed direction Z as well as through the longitudinal slot 6 or the antenna 13. The front face of the spacer slides 24, 24' is slanted from the inside surface towards the outside surface so as to improve, in interaction with the complementarily slanted spacer slide surfaces 9, 9' the centering of the antenna 13 in the longitudinal slot 6, on the one hand, and to reduce the friction generated by the pressure of the spacer slides 24, 24' exerted on the spacer slide surfaces 9, 9' by means of the compensating springs 22, 22', on the other hand.

In an alternative embodiment of the invention (not shown in the drawings), instead of the two symmetrically configured spacer slides 24, 24', it is possible to use only a single spacer slide which, in this case, preferably engages in a complementarily configured spacer slide groove. This spacer slide groove, where applicable, can be configured similarly to the sliding contact grooves in order to prevent the single spacer slide from popping out of the spacer slide groove. The two spacer slides 24, 24' shown in FIGS. 2 and 4, however, have the advantage that they ensure the self-centering of the antenna and avoid the risk of the aforementioned popping out.

As an alternative or in addition, the spacer element can also be configured in the form of a spacer roller or rollers. The spacer rollers can then roll along the slanted spacer slide surfaces 9, 9', or the spacer slide surfaces 9, 9' can be completely omitted. Thus, the crosspieces 7, 7' can form rolling surfaces configured at right angles to the feed direction, along which the rolling surfaces the spacer rollers can roll. Spacer rollers have the advantage that in contrast to the spacer slides 24, 24', no abrasion caused by the sliding movement is generated.

In the embodiment example at hand, the antenna holder 19 is movably connected to the sliding contact carrier 11 in the feed direction Z by means of snap-action connections, with, in the case at hand, detent lugs 25, 25' of the antenna holder 19 engaging in complementary detent openings 26, 26' which are oriented in the direction Z. In the feed direction, the detent openings 26, 26' are sufficiently long so that, when the sliding contact carrier 11 moves in the feed direction Z towards the conductor line 2, the detent lugs 25, 25' are able to evasively move in the opposite direction, with the detent lugs 25, 25' outwardly bouncing towards the detent openings 26, 26' ensuring that there is no risk of the antenna holder 19 disengaging from the sliding contact carrier 11.

As the height of the sliding contacts 12, 12' decreases in the feed direction Z due to wear, the feed device presses the entire current collector 10 and, in particular, the sliding contact carrier 11 towards the conductor line 2 against the grounding conductor profile 3 in order to ensure continuous electrical contact between the sliding contact grooves 8, 8' and the sliding contacts 12, 12'. However, in contrast to the conventional current collectors, the antenna 13 does not move towards the conductor line 2 along with the sliding contacts 12, 12' and does not penetrate with increasing depth into the cavity 5 but is maintained at the same distance from and in the same position relative to the cavity 5 by means of the spacer slides 24, 24', and the antenna 13 is mounted so as to be able to move in the feed direction Z relative to the sliding contacts 12, 12' and the sliding contact carrier 11.

In this manner, the data transmission properties of the slotted waveguides 4 can be kept essentially constant over a long period of time, and deterioration only occurs after the spacer slide surfaces 9, 9' and/or the spacer slides 24, 24' have worn down.

LIST OF REFERENCE CHARACTERS

1 Conductor line system
2 Conductor line
3 Grounding conductor profile
4 Slotted waveguide
5 Cavity
6 Longitudinal slot
7, 7' Longitudinal crosspieces
8, 8' Sliding contact groove
9, 9' Spacer slide surfaces
10 Current collector 11 Sliding contact carrier
12, 12' Sliding contacts
13 Antenna
14 Protective sleeve for the antenna
15 Antenna socket
16 Antenna plug
17 Antenna line
18 Through opening for the antenna line
19 Antenna holder
20, 20' Spring blocks
21, 21' Springs seats for the antenna holder
22, 22' Compensating springs for the antenna holder
23, 23' Spring seats for the sliding contact carrier
24, 24' Spacer slides
25, 25' Detent lugs
26, 26' Detent openings
L Longitudinal direction of the conductor line
Q Direction transverse relative to the longitudinal direction in the traversing plane
Z Feed direction of the sliding contacts at right angles relative to the traversing plane

The invention claimed is:

1. A current collector comprising:
at least one sliding contact for making electrical contact with a conductor profile of a conductor line; and
at least one antenna for engaging in a longitudinal slot of the conductor profile, the longitudinal slot running in a longitudinal direction of the conductor line,
wherein the at least one sliding contact and the at least one antenna are able to be jointly moved towards the conductor profile in a feed direction by a feed device of the current collector,
the at least one antenna is movably mounted on the current collector in the feed direction relative to the at least one sliding contact,
the at least one antenna is disposed in an antenna holder that is able to move in the feed direction relative to the at least one sliding contact, at least one spacer slide for sliding or rolling along the conductor profile being disposed on the antenna holder, and
at least one compensating element is disposed between the at least one sliding contact and the at least one antenna, the at least one compensating element pressing the at least one antenna in the feed direction towards the conductor line and at the same time allowing movement of the at least one antenna and the at least one spacer slide relative to the at least one sliding contact against the feed direction.

2. The current collector of claim 1, wherein the at least one spacer slide comprises two spacer slides arranged on opposite sides along sides of the at least one antenna.

3. The current collector of claim 2, wherein the spacer slides have slanted front faces.

4. The current collector of claim 1, wherein the at least one sliding contact is disposed in a sliding contact carrier, the at least one compensating element being arranged between the sliding contact carrier and the at least one antenna and/or the antenna holder.

5. The current collector of claim 1, wherein the at least one compensating element comprises at least one elastic compensating element and/or a compensating spring.

6. The current collector of claim 1, wherein, on deflection of the at least one sliding contact from a contact position on the conductor profile in the feed direction away from the conductor profile, the feed device exerts a restoring force on the at least one sliding contact in the feed direction towards the conductor profile.

7. The current collector of claim 6, wherein the feed device comprises a spring arm.

8. The current collector of claim 1, wherein the at least one antenna, at least in an area intended for engaging in the longitudinal slot, is surrounded by an electrically insulating protective sleeve.

9. The current collector of claim 1, wherein the feed direction runs at right angles to a traversing plane of the current collector, and the traversing plane extends along the longitudinal direction.

10. A conductor line system comprising:
a conductor line with a conductor profile that extends in a longitudinal direction with an elongated cavity and an adjoining longitudinal slot that extends in the longitudinal direction; and
a current collector of an electrical load able to be moved along the conductor line, the current collector including at least one sliding contact and further including at least one antenna engaged in the adjoining longitudinal slot of the conductor profile, the at least one sliding contact and the at least one antenna being able to be jointly moved towards the conductor profile in a feed direction by a feed device of the current collector, and the at least one antenna being able to move in the feed direction relative to the at least one sliding contact,
wherein the conductor profile includes at least one sliding contact groove for the at least one sliding contact of the current collector of the electrical load,
the conductor profile also includes at least one spacer slide surface that extends in the longitudinal direction for at least one spacer slide of the current collector, the at least one spacer slide for sliding or rolling along the conductor profile, and
at least one compensating element is disposed between the at least one sliding contact and the at least one antenna, the at least one compensating element pressing the at least one antenna in the feed direction towards the conductor line and at the same time allowing movement of the at least one antenna and the at least one spacer slide relative to the at least one sliding contact against the feed direction.

11. The conductor line system of claim 10, wherein the at least one spacer slide surface comprises two spacer slide surfaces arranged on opposite sides along the sides of the adjoining longitudinal slot.

12. The conductor line system of claim 11, wherein the spacer slide surfaces extend at an oblique angle away from the adjoining longitudinal slot.

13. The conductor line system of claim 10, wherein the elongated cavity and the adjoining longitudinal slot form a slotted waveguide.

14. The conductor line system of claim 10, wherein the at least one antenna is disposed in an antenna holder that is able to move in the feed direction relative to the at least one sliding contact.

15. The conductor line system of claim 14, wherein the at least one spacer slide is disposed on the antenna holder.

16. A conductor line system comprising:
a conductor line with a conductor profile that extends in a longitudinal direction with an elongated cavity and an adjoining longitudinal slot that extends in the longitudinal direction; and
a current collector that includes at least one antenna for engaging in the adjoining longitudinal slot, and at least one sliding contact for making electrical contact with the conductor profile of the conductor line, wherein the at least one sliding contact and the at least one antenna are able to be jointly moved towards the conductor profile in a feed direction by a feed device of the current collector, the at least one antenna is movably mounted on the current collector in the feed direction relative to the at least one sliding contact, the at least one antenna is able to move in the feed direction relative to the at least one sliding contact, the current collector including at least one spacer slide for sliding or rolling along the conductor profile, and at least one compensating element is disposed between the at least one sliding contact and the at least one antenna, the at least one compensating element pressing the at least one antenna in the feed direction towards the conductor line and at the same time allowing movement of the at least one antenna and the at least one spacer slide relative to the at least one sliding contact against the feed direction.

17. The conductor line system of claim 16, wherein the conductor profile includes at least one sliding contact groove for the at least one sliding contact of the current collector, and the conductor profile also includes at least one spacer slide surface that extends in the longitudinal direction for the at least one spacer slide of the current collector.

18. The conductor line system of claim 16, wherein the at least one antenna is disposed in an antenna holder that is able to move in the feed direction relative to the at least one sliding contact, the at least one spacer slide being disposed on the antenna holder.

* * * * *